United States Patent [19]

Bechler

[11] 3,847,043
[45] Nov. 12, 1974

[54] AUTOMATIC THREAD CUTTING MACHINE

[76] Inventor: André Bechler, 4, rue Centrale, 2740 Moutier, Switzerland

[22] Filed: Sept. 25, 1972

[21] Appl. No.: 292,133

[30] Foreign Application Priority Data
Sept. 30, 1971 Switzerland.................. 14230/71

[52] U.S. Cl.............................. 82/5, 82/19, 29/41, 29/44
[51] Int. Cl.......... B23b 3/18, B23b 3/26, B23b 3/28
[58] Field of Search............ 29/39, 41, 42, 44, 564; 82/19, 5; 74/826

[56] References Cited
UNITED STATES PATENTS

| 1,132,920 | 3/1915 | Fay | 82/5 X |
|---|---|---|---|
| 1,870,325 | 8/1932 | Douglas | 82/5 X |
| 2,084,898 | 6/1937 | Eckardt et al. | 82/5 X |
| 2,176,676 | 10/1939 | Lupo | 82/5 |
| 2,590,224 | 3/1952 | Armstrong | 82/5 X |
| 3,308,694 | 3/1967 | Bechler | 29/42 |
| 3,435,498 | 4/1969 | Lewry | 29/42 |
| 3,663,999 | 5/1972 | Catlin | 29/44 |
| 3,717,912 | 2/1973 | Lahm | 74/826 X |
| 3,732,759 | 5/1973 | Fedorenko | 82/19 |

FOREIGN PATENTS OR APPLICATIONS

| 923,587 | 2/1955 | Germany | 29/41 |
|---|---|---|---|
| 741,338 | 11/1943 | Germany | 82/5 |

*Primary Examiner*—C. W. Lanham
*Assistant Examiner*—D. M. Gurley
*Attorney, Agent, or Firm*—Werner W. Kleeman

[57] ABSTRACT

An automatic thread cutting machine having a workpiece spindle, a tool support disk which can be rotatably indexed about a geometric axis intersecting at right angles the axis of rotation of the workpiece spindle. At least one thread cutting device is secured to the tool support disk. The thread cutting device guides a thread cutting tool holder at a housing for carrying out lengthwise movements in radial direction to the tool support disk and transverse movements in the direction of the aforementioned geometric axis. A shaft mounted at the housing supports a cam element for controlling the lengthwise movements and a cam element for controlling the transverse movements. A drive connection is provided between this shaft of the thread cutting device and the workpiece spindle, and a motor driven mechanism is provided for moving the tool support disk in the direction of its geometric axis.

1 Claim, 7 Drawing Figures

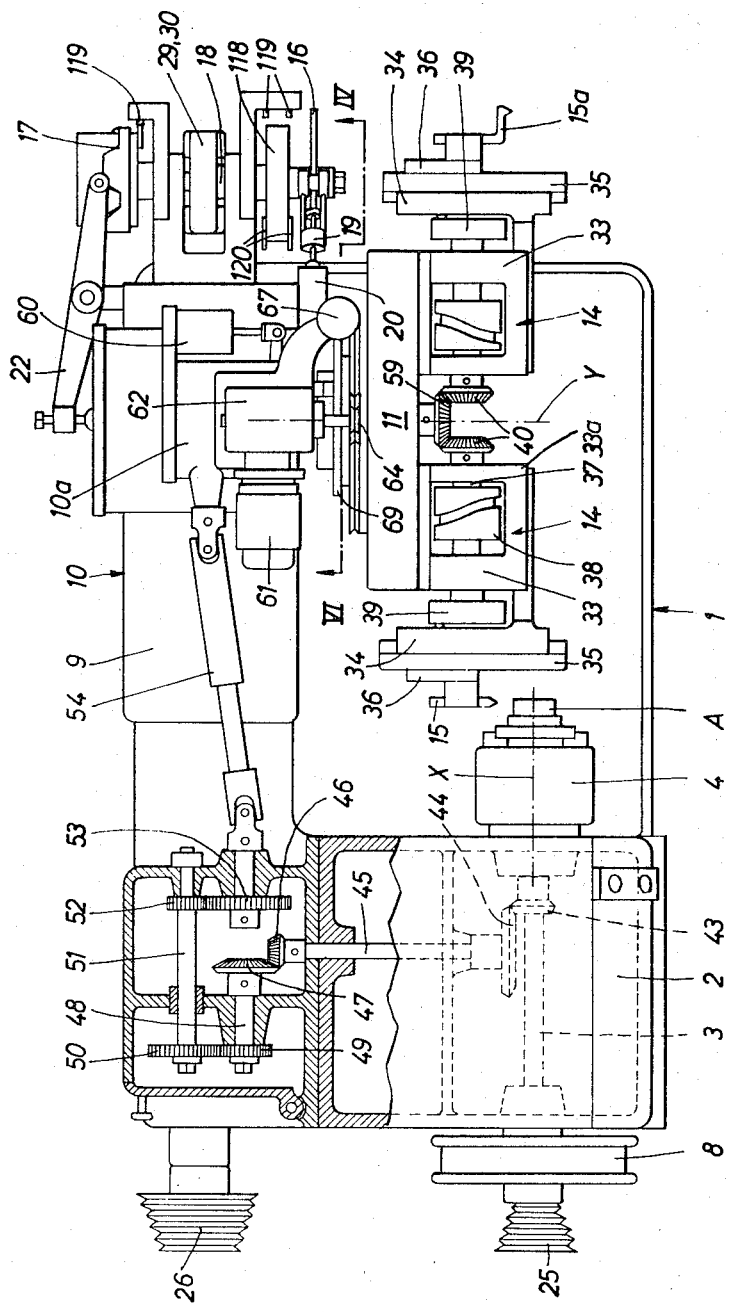

AUTOMATIC THREAD CUTTING MACHINE

BACKGROUND OF THE INVENTION

The present invention relates to a new and improved construction of machine tool and more specifically, to a new and improved construction of automatic thread cutting machine.

In practice it often happens that two or more threads which should be perfectly coaxial should be cut at a workpiece. This work cannot be carried out through the use of screw taps and screw dies. At automatic lathes there prevails at the work zone, where there must come into operable play a number of tools in a machining cycle in order to be able to turn smooth, for instance, cylindrical, planar, conical or profiled surfaces, very tight space conditions. Therefore, it is practically impossible to provide at such location at a cross-slide or compound slide more than one thread cutting device, the tool of which while being controlled by rotating cam disks carries out lengthwise movements in the direction of the workpiece axis during the cutting strokes and return strokes, as well as transverse movements for the infeed and retraction of the tool. Hence, it is not possible to machine two or more threads at the workpiece without rechucking same. Additionally, it must be taken into account that for the operation of each thread cutting device it is necessary that the cam disks, namely those for controlling the lengthwise movement, are driven in a certain rotational speed relationship with respect to the workpiece spindle, so that there is necessary the presence of a correspondingly constructed drive connection.

SUMMARY OF THE INVENTION

It is a primary object of the present invention to provide a new and improved automatic thread cutting machine which renders it possible to cut at a workpiece without rechucking the latter two or more threads.

A further object of the invention is to provide an improved thread cutter machine having a compact construction requiring a relatively small constructional expenditure, especially an expenditure in elements for the drive connection between the workpiece spindle and the control cams of the thread cutting device(s).

Now in order to implement these and still further objects of the invention, which will become more readily apparent as the description proceeds, the invention contemplates a new and improved construction of automatic thread cutting machine having a workpiece spindle, wherein at least one thread cutting device is secured to a workpiece support disk which can be rotatably indexed about a geometric axis intersecting at right angles the axis of rotation of the workpiece spindle. At the thread cutting device a thread cutting tool holder is guided at a housing for carrying out lengthwise movements in radial direction of the tool support disk and transverse movements in the direction of the aforesaid geometric axis. A shaft mounted at the housing carries a cam element for controlling the lengthwise movements and a cam element for controlling the transverse movements. Additionally, a drive connection exists between this shaft of each thread cutting device and the workpiece spindle and there is also provided a motor driven mechanism for moving the tool support disk in the direction of the geometric axis.

As part of the state-of-the-art there is here mentioned U.S. Pat. No. 3,435,498, granted Apr. 1, 1969. This patent discloses a multiple operation machine tool wherein a workpiece, during the time that it is clamped at a first workpiece holder, is subjected to a first series of machining operations, thereafter transferred to a second workpiece holder and brought to the operable region of the tools carried by a star turret. Conventional boring tools are part of such tools, the rotary drive of which occurs by transmission means accommodated at the turret. There is also provided a holder for a screw tap or a screw die, with means for the rotary drive and for the lengthwise feed in one or the other direction. On the other hand, what is missing in this piece of equipment completely are the following:

a. a thread cutting device as above-defined;
b. the motor driven mechanism for moving the turret in the direction of its indexing axis; and
c. a driven connection between a shaft (associated with the missing thread cutting device of item (a) above) and the workpiece spindle.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is a plan view of the automatic thread-cutting machine of FIG. 1;

DETAILED DESCRIPTION OF THE PREFERRED EMBODIMENTS

Figure 4:
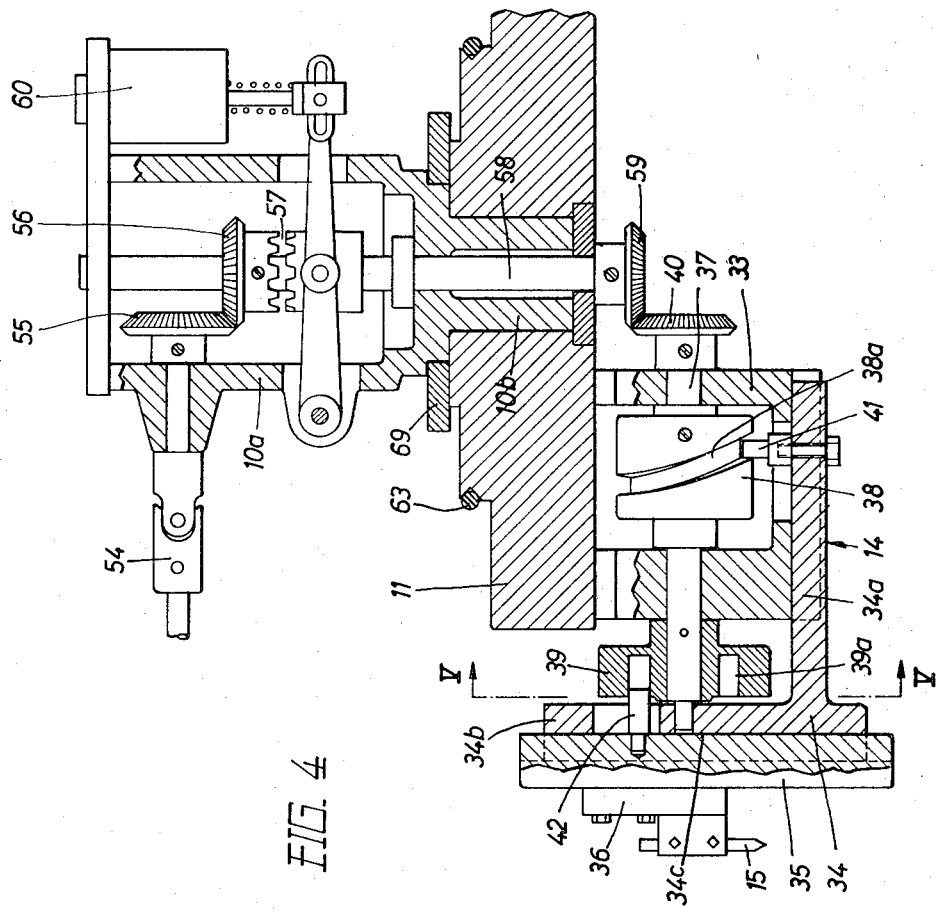
FIG. 4 is a partial horizontal sectional view taken along the line IV—IV of FIG. 1, in which there has been depicted on an enlarged scale details of the thread-cutting device and its drive connection with the workpiece spindle.
Figure 6:
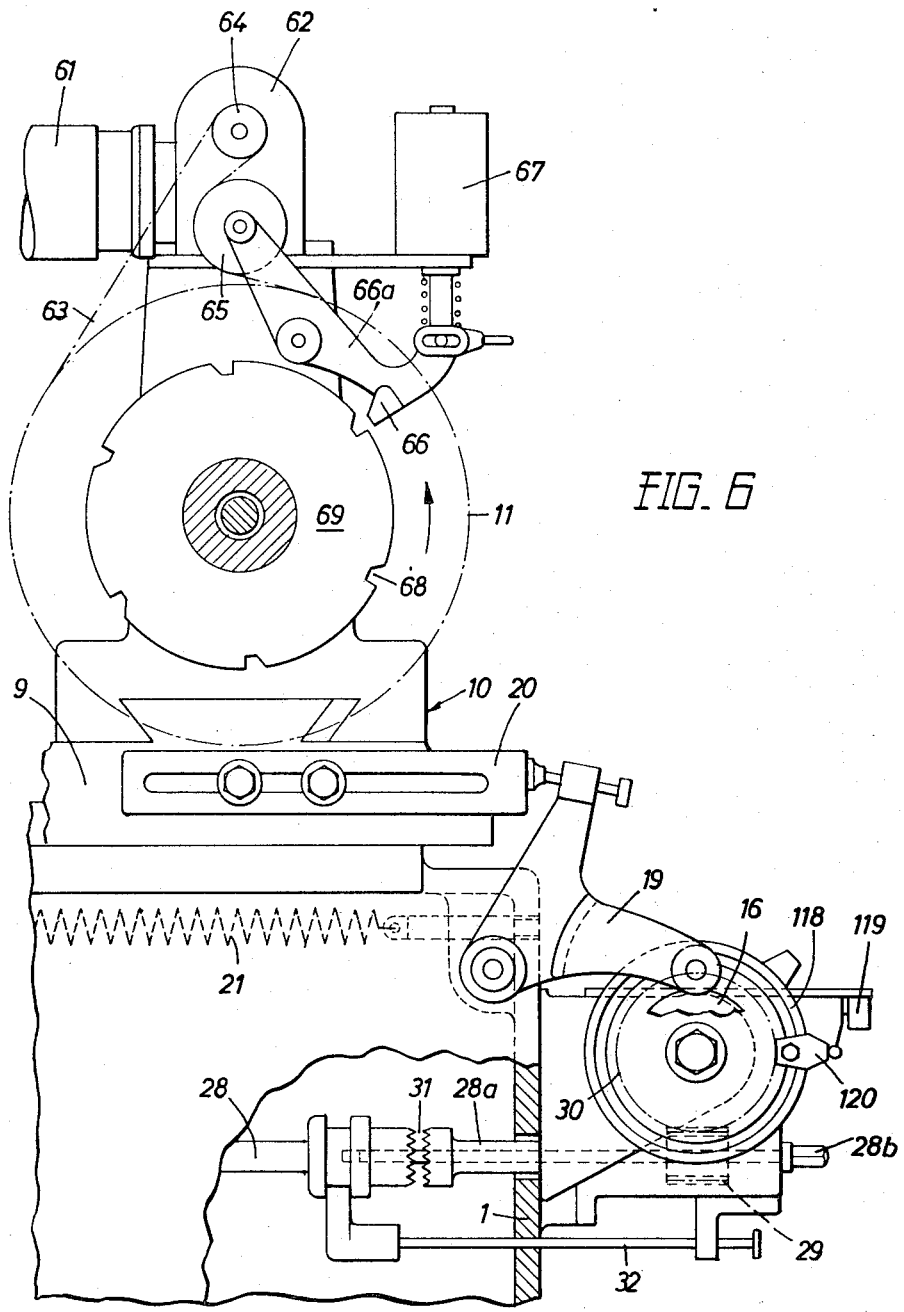
FIG. 6 is a partial sectional view of the equipment of FIG. 1, taken along the line VI—VI of FIG. 3, in which there is depicted on an enlarged scale details of the drive of a control shaft and mechanism for indexing a workpiece support disk.
Figure 7:
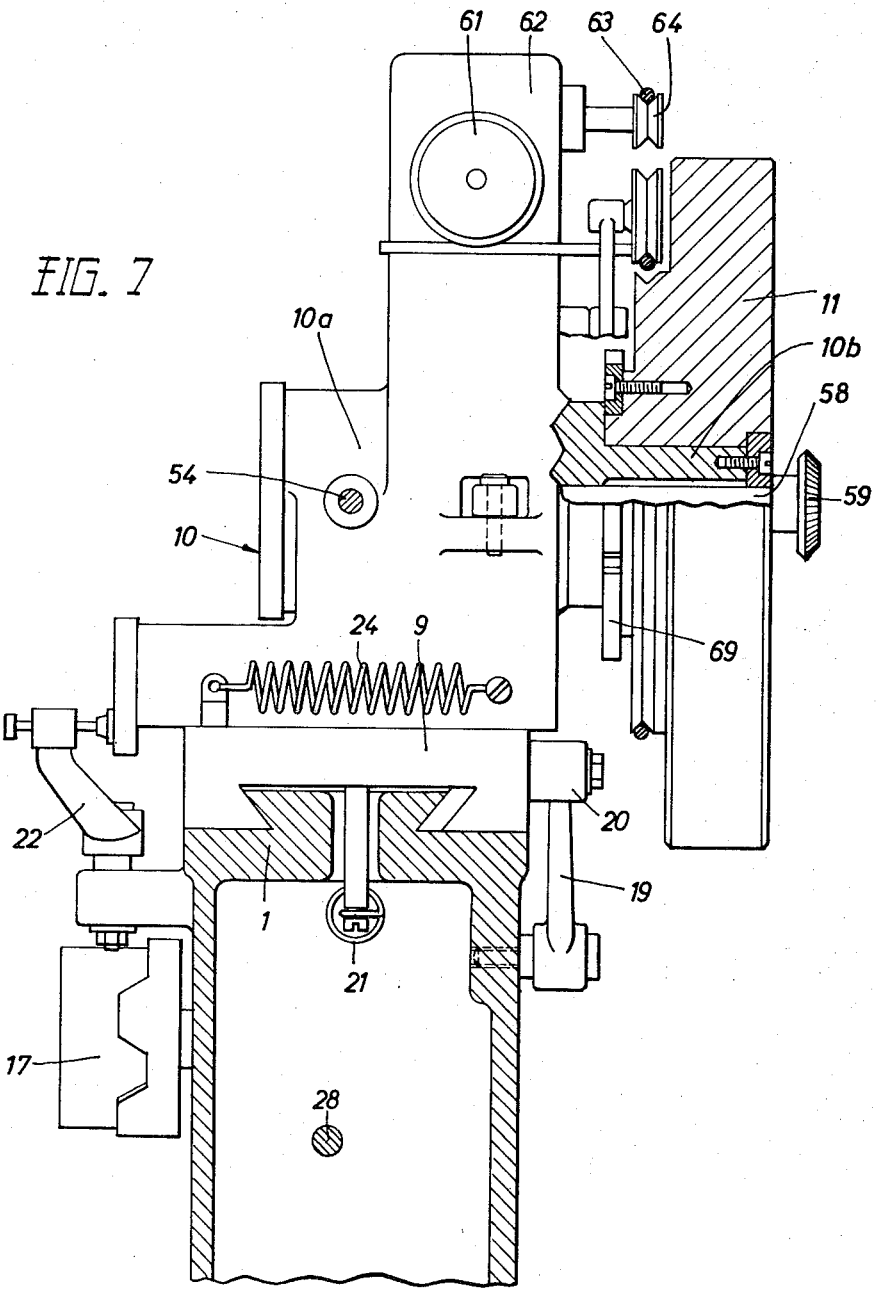
FIG. 7 partially illustrates in side view and partially in cross-sectional view the arrangement of FIG. 6.

Describing now the drawings, it will be seen that a headstock 2 is arranged at a machine bed 1 and a workpiece spindle 3 is arranged at the headstock 2. The workpiece spindle 3 is equipped with chuck 4 and driven by an electric motor 5 by means of belt drive arrangement 6, 7, 8. At the bed 1 there is displaceably guided a longitudinal slide 9 in a direction parallel to the axis of rotation X (FIG. 3) of the workpiece spindle 3. At this longitudinal or lengthwise slide 9 there is displaceably guided a cross-slide 10 in a direction perpendicular to the aforementioned axis of rotation X. This cross-slide 10 is constructed at its upper portion in the form of a bearing or pillow block 10a, at its forwardly protruding hollow cylindrical portion 10b (FIGS. 4 and 7) of which there is rotatably mounted a tool support disk 11 for rotation about an axis Y. The axis Y intersects at right angles the axis of rotation X of the workpiece spindle 3. By means of a still yet to be described indexing mechanism the tool support disk 11 can be advanced or indexed through increments of, for instance, 60°.

Now with the illustrated exemplary embodiment there are clamped at the front face of the tool support disk 11, apart from the tool holders such as indicated by reference character 12, at which there is clamped a respective turning tool 13, two thread-cutting or chaser devices 14 possessing a respective thread chaser or screw cutting tool 15 and 15a. By indexing the tool support disk 11 the individual tools can be brought into the work position at the workpiece A. It should be understood that, for instance, it also would be possible to mount a tool holder equipped with a borer at the support disk 11 and the sequence of the successive tools which come into operation can be varied optionally as required.

Figure 1:
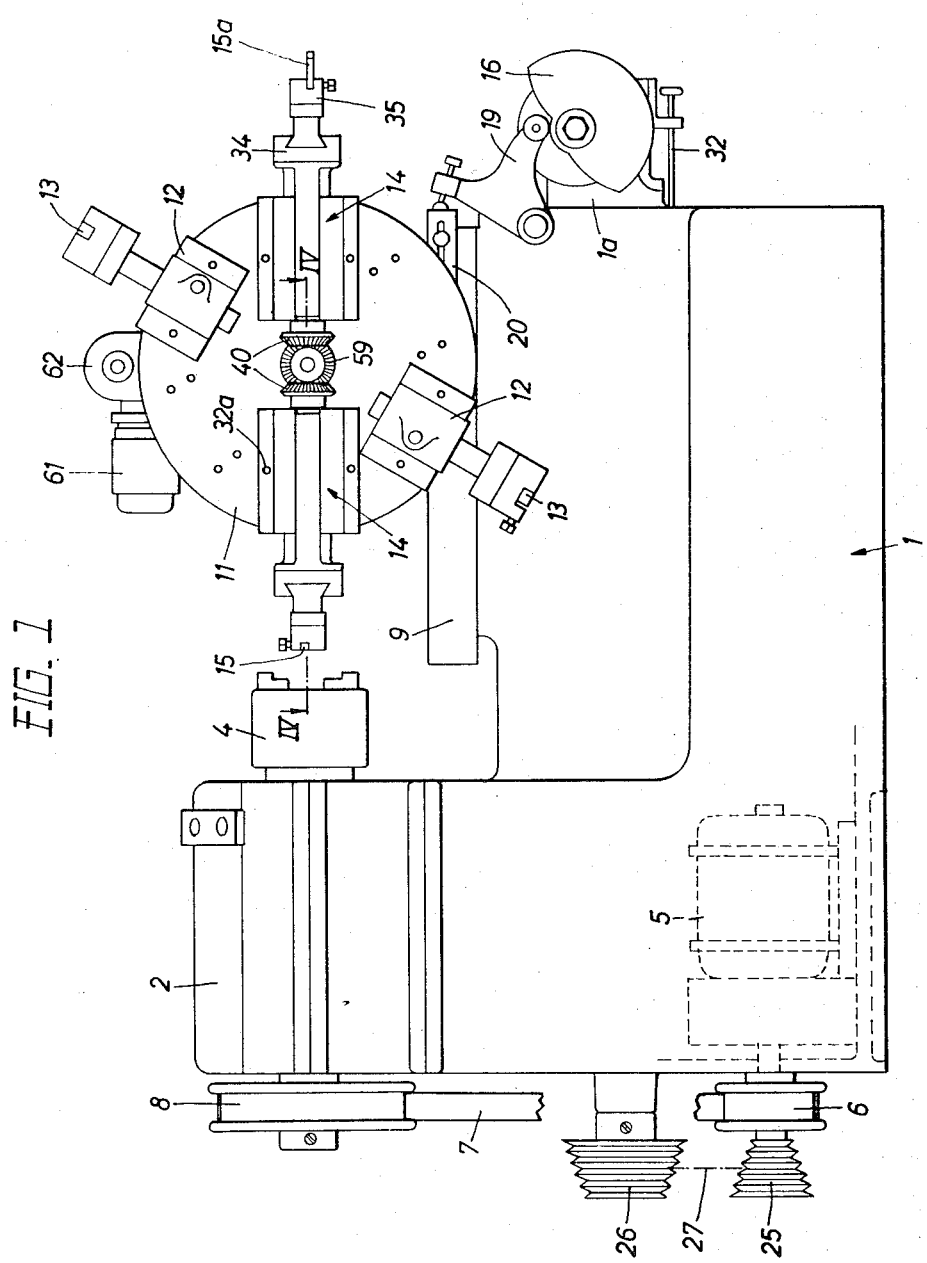
FIG. 1 is an elevational view of an automatic thread-cutting machine designed according to the teachings of the present invention.
Figure 2:
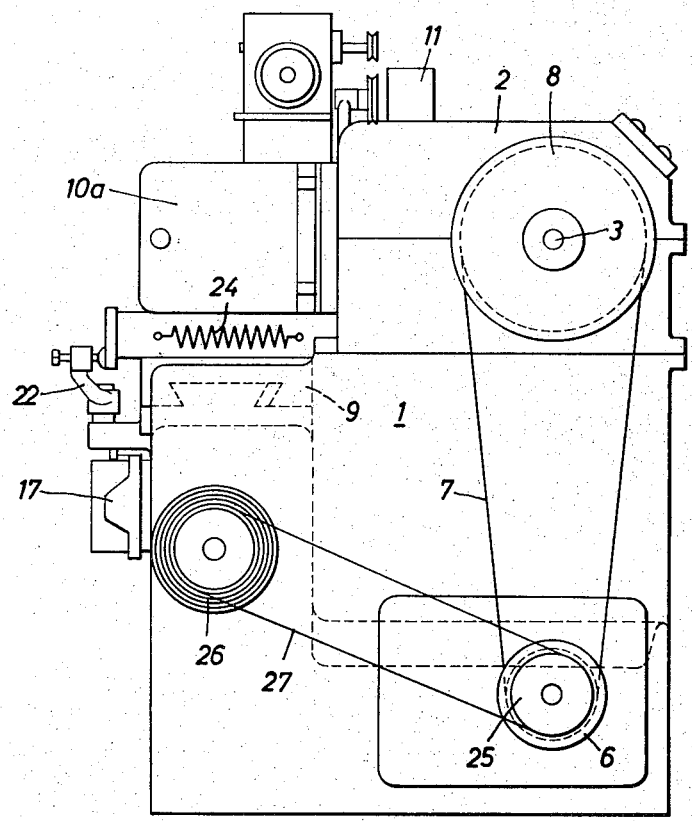
FIG. 2 is a side view of the automatic thread-cutting machine of FIG. 1.

For controlling the movements of the slides 9 and 10 together with the support disk 11 there are provided control elements, here shown in the form of cam elements 16 and 17 respectively, both of which are fixedly seated upon a control shaft 18 and have only been schematically depicted in the drawing to preserve clarity in illustration. The profile of the cam element disk 16 is scanned by a feeler lever 19 mounted at the bed 1, this feeler lever 19 acting upon a rail 20 secured to be lengthwise adjustable at the longitudinal slide 9. A spring 21 continuously strives to displace the longitudinal or lengthwise slide 9 towards the right of FIG. 1. The cam element 17, here in the form of a cam drum, is scanned by a feeler lever 22 mounted at the bed 1, this feeler lever 22 acting upon the rear of the cross-slide 10. A spring 24 (FIG. 7) continuously strives to draw the cross-slide 10 towards the rear.

The control shaft 18 is mounted at the support or bearing frame 1a secured to one end face of the bed 1. The support frame 1a carries electrical microswitches 119 which serve to control auxiliary functions and are actuated by cams 120. Certain ones of such cams are peripherally or circumferentially adjustable at a drum 118 fixedly seated upon the control shaft 18, other such cams are secured, for instance, to the body of the cam drum 17.

The drive of the control shaft 18 occurs through the agency of the motor 5 by means of a belt drive incorporating the step pulleys 25, 26 and belt 27, and furthermore through the agency of a transmission shaft 28, 28a and a worm drive or gearing 29, 30. Between the sections 28, 28a of the transmission shaft there is arranged a claw coupling 31 which can be manually disengaged by means of a rod 32, for instance during setting-up the machine, whereupon the shaft section 28a and therefore the control shaft 18 can be manually rotated by means of a crank mounted upon the square end 28b.

Figure 5:
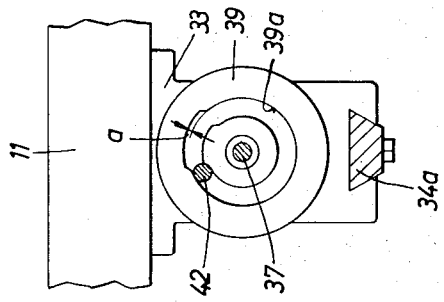
FIG. 5 is a partial sectional view of the arrangement of FIG. 4, taken substantially along the line V—V thereof.

The thread cutting devices 14 of the illustrated exemplary embodiment each comprises a housing 33 secured by means of threaded bolts 32a or other suitable means at the support disk 11. At the front face of housing 33 there is formed a guide track or path 33a which extends in the radial direction of the support disk 11. At this guide track 33a there is displaceably guided the leg 34a of a L-shaped element 34, the other leg 34b of which has a guide track or path 34c parallel to the axis of the support disk 11. In this guide track or path 34c there is guided a carriage 35 at which there is secured a holder 36 for the thread-cutting or screw cutting tool 15 (or 15a). At the housing 33 there is mounted an auxiliary shaft 37 at which is fixedly seated a cam drum 38 with the cam groove 38a, a cam disk 39 with a cam groove 39a and a bevel gear 40. The cam groove 38a constitutes a lengthwise feed cam for the associated tool or chaser 15 (or 15a) and in development possesses a sawtooth-shape. It is scanned by a bolt 41 fixedly seated at the leg 34a. The cam groove 39a is a lifting cam for the same tool 15 (or 15a) and is composed of two concentric sections and two connection sections (FIG. 5); it is continuously scanned by a bolt 42 fixedly seated at the carriage 35.

The shaft 37 of each thread-cutting device 14 must rotate at a constant speed during each working cycle or period of this device, and this speed must be in a given relationship to that of the workpiece spindle 3. It is for this reason that there is provided an appropriate drive connection as will now be explained hereinafter. The workpiece spindle 3 drives through the agency of a bevel gear drive 43, 44 an intermediate shaft 45 and a bevel gear drive 46, 47 of an input shaft 48 of a change-gear transmission 48a, the change-gears of which are designated by reference characters 49, 50. The drive is transmitted via a shaft 51 and a pair of gears 52, 53, to a telescopic Cardan or universal-joint shaft 54. Within the bearing housing 10a belonging to the crossslide 10 the drive is transmitted through the agency of a bevel gear drive 55, 56 and disengageable claw coupling 57 to a transmission shaft 58 which piercingly extends through and coaxially with respect to the tool support disk 11, and finally by means of a bevel gear 59 seated at the front end of such shaft 58 to bevel gear 40 fixedly seated upon the auxiliary shaft 37. The claw coupling 57 is only then engaged when a thread-cutting device 14 is located in its work position. For this purpose there is provided an electromagnet 60, the power supply of which is controlled for such purpose via suitable elements, to which there belongs one of the microswitches 120.

For the stepwise indexing of the tool support disk 11 there is provided in the illustrated exemplary embodiment a mechanism wherein there is mounted at the housing 10a belonging to the cross-slide 10 a unit or block embodying electric motor 61 and worm gear drive 62. A belt 63 travels over a belt pulley 64 seated upon the output shaft of this unit, then over a deflecting pulley or disk 65 and in a groove of a stepped portion of the support disk 11. The deflecting disk 65 is mounted at one end of a balance or rocker 66a mounted at the bearing housing 10a, the other arm of which carries a locking tooth 66 and is operatively connected with an actuation electromagnet 67. With the motor 61 switched-on and the electromagnet 67 energized (both controlled by means of one of the cams 120 and the associated microswitch 119, in other words as a function of the rotational position of the control shaft 18) the belt 63 is tensioned by the disk 65 and the locking tooth 66 is located in its ineffectual position. As a result the support disk 11 is rotated. Soon thereafter the electromagnet is again deenergized; the locking tooth 66 then engages with one of the locking notches or recesses 68 which is provided at a locking or engaging disk 69 secured to the support disk 11.

During operation the control shaft 18 carries out one revolution for a complete machining cycle at a workpiece. In so doing it controls the electric motor 61 and the electromagnet 67 for the indexing of the support disk 11 as well as the electromagnet 60 for the engagement and disengagement of the claw coupling 57. Furthermore, this control shaft 18 controls by means of its cam elements 16, 17 the lengthwise and transverse movements of the support disk 11 and therefore the tools carried thereby.

In the case of a thread-cutting tool 15 or 15a located in its work position the transverse movements successively constitute the rapid infeed to the workpiece, the uniform infeed for increasing the depth of cut and the rapid return movement after completion of cutting of the threading; upon the uniform infeed for increasing the depth of cut and penetration at the workpiece there is superimposed the movements for such tool 15 or 15a, which are produced by the cams 38a, 39 of the thread cutter device and are repeated during a number of revolutions of the thread cutter device components 37, 38, 39. With each such rotation there is carried out in succession;

a. rapid application of the tool by the cam 39a through the small path $a$ at the workpiece;

b. during cutting engagement at the workpiece the tool is displaced parallel to the axis of the workpiece by the lengthwise feed cam 38a;

c. by means of the lift cam 39a the tool is raised from the workpiece by the amount $a$; and d. by means of a steep section of the cam 38a the tool is again rapidly retracted back into the starting position.

It should be apparent that the pitch of the produced threads is governed by the steepness of the section of the lengthwise feed curve 38a mentioned above under item (b) and by the ratio of the rotational speed between the cam element 38 (therefore the auxiliary shaft 37) and the workpiece spindle 3, so that by employing a different change gear pair 49, 50 such can be changed. The infeed brought about by the cam element 17 must be equal to null during the last (or already the next to last) rotation of the thread cutter device components 37, 38, 39 so that the produced thread is perfectly cylindrical.

With the described automatic thread cutting device it is possible to cut at a workpiece during a single clamping operation, apart from the conventional turning or lathe work, also two threads, for instance an inner and outer thread, wherein the entire sequence of the operations or functions can be completely automatically controlled.

While there is shown and described present preferred embodiments of the invention, it is to be distinctly understood that the invention is not limited thereto, but may be otherwise variously embodied and practiced within the scope of the following claims.

Accordingly, what is claimed is:

1. An automatic thread cutting machine, comprising a workpiece spindle rotatable about an axis of rotation, a tool support disk, means for rotatably indexing the tool support disk for rotation about a geometric axis which intersects at right angles the axis of rotation of the workpiece spindle, at least one thread cutting device secured to the tool support disk, a housing provided for the thread cutting device, a thread cutting tool holder guided at the housing for carrying out lengthwise movements in radial direction of the tool support disk and transverse movements in the direction of the geometric axis, a shaft mounted at the housing of the thread cutting device, said shaft carrying a cam element for controlling the lengthwise movements and a cam element for controlling the transverse movements, drive connection means between said shaft of the thread cutting device and the workpiece spindle, motor driven means for moving the tool support disk in the direction of its geometric axis, a bed, a bearing block, the tool support disk being rotatably but non-axially movably supported at the bearing block, said bearing block belonging to said motor driven means, a cross-slide carried by the bed, said bearing block being mounted at said cross-slide, a motor driven-control shaft, a cam element seated on the motor driven-control shaft for controlling movement of the cross-slide, said drive connection means between the workpiece spindle and the shaft of the thread cutting device comprises a transmission shaft mounted at the bearing block substantially coaxially with regard to the tool support disk and piercingly extending through the latter, a telescopic universal shaft means and a change-gear drive mounted at the bed, a coupling mechanism which can be engaged and disengaged, said coupling mechanism being arranged between the transmission shaft and the universal shaft means, and means for ensuring that the coupling mechanism only will be engaged when the tool support disk assumes an indexing position in which the thread cutting device is located in its work position.

\* \* \* \* \*